United States Patent
Visconti et al.

(10) Patent No.: US 11,105,632 B2
(45) Date of Patent: Aug. 31, 2021

(54) METHOD AND DEVICE FOR DEMODULATING GYROSCOPE SIGNALS

(71) Applicant: Robert Bosch GmbH, Stuttgart (DE)

(72) Inventors: Andrea Visconti, Munich (DE);
Francesco Diazzi, Munich (DE);
Guangzhao Zhang, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 16/096,163

(22) PCT Filed: Mar. 8, 2017

(86) PCT No.: PCT/EP2017/055473
§ 371 (c)(1),
(2) Date: Oct. 24, 2018

(87) PCT Pub. No.: WO2017/194223
PCT Pub. Date: Nov. 16, 2017

(65) Prior Publication Data
US 2019/0137272 A1    May 9, 2019

(30) Foreign Application Priority Data
May 9, 2016  (DE) .......................... 102016207887.9

(51) Int. Cl.
*G01C 19/5776* (2012.01)
(52) U.S. Cl.
CPC ................ *G01C 19/5776* (2013.01)
(58) Field of Classification Search
CPC ................................................. G01C 19/5776
See application file for complete search history.

(56) References Cited

U.S. PATENT DOCUMENTS

| | | | |
|---|---|---|---|
| 6,487,787 B1* | 12/2002 | Nahum | G01D 18/008 33/702 |
| 7,290,435 B2 | 11/2007 | Seeger et al. | |
| 2007/0152618 A1* | 7/2007 | Saotome | G01P 9/00 318/568.12 |
| 2014/0190258 A1* | 7/2014 | Donadel | G01C 19/5776 73/504.12 |
| 2015/0057959 A1* | 2/2015 | Ezekwe | G01C 19/5776 702/96 |

FOREIGN PATENT DOCUMENTS

JP     2006038456 A     2/2006

OTHER PUBLICATIONS

International Search Report for PCT/EP2017/055473, dated June 23, 2017.

* cited by examiner

*Primary Examiner* — Tarun Sinha
*Assistant Examiner* — Yossef Korang-Beheshti
(74) *Attorney, Agent, or Firm* — Norton Rose Fulbright US LLP; Gerard Messina

(57) ABSTRACT

A method and a device for processing signals, including a demodulator demodulating a modulated signal during a first time interval in such a way that a quadrature signal is generated, the quadrature signal is stored in a memory unit of the device, the demodulator demodulating the modulated signal in such a way that an in-phase signal is generated during a second time interval and an output signal for describing a rotation of the gyroscope about a defined sensing axis is generated from the in-phase signal.

6 Claims, 4 Drawing Sheets

METHOD AND DEVICE FOR DEMODULATING GYROSCOPE SIGNALS

FIELD

The present invention relates to a method and device for demodulating gyroscope signals.

BACKGROUND INFORMATION

Methods for processing signals from a gyroscope are generally available.

It is becoming increasingly popular to use sensors, such as gyroscopes, in electronic terminal devices, and to use sensors for applications such as navigation, in buildings, and for augmented reality.

A good performance of the terminal devices or of the applications necessitates that the gyroscopes used satisfy stringent requirements in terms of the long-term stability thereof and the insensitivity to drifts. A drift is understood in this case to be a systematic effect that changes continuously in one direction.

Good performances are usually achieved by using closed-loop control circuits or electrical circuits having closed-loop architectures. In this case, however, electrical circuits having closed-loop architectures disadvantageously consume more energy than electrical circuits that do not have closed-loop architectures. In contrast to electrical circuits that do not have closed-loop architectures, a further disadvantage of electrical circuits that have closed-loop architectures is that, in the case of micromechanical sensors, both the MEMS unit (microelectromechanical systems unit), as well as the ASIC unit (application-specific integrated circuit unit) require a relatively large surface area.

Because of this disadvantage that electrical circuits that have closed-loop architectures have in contrast to those that do not have closed-loop architectures, and due to a lower complexity of the electrical circuits that do not have closed-loop architectures, electrical circuits that do not have closed-loop architectures are often used for user applications.

One of the main causes of insufficient long-term stability and insensitivity to gyroscope drifts is a change in the product of the quadrature signal and the sine of the error in the demodulation phase. There have already been various approaches for improving long-term stability and providing sufficient insensitivity to gyroscope drifts.

U.S. Pat. No. 7,290,435 B2 and U.S. Patent Application Pub. No. 2014/0190258 A1, for example, describe canceling the quadrature signal, respectively computationally eliminating it already at the front end before the signal generated by the gyroscope is measured. In addition, U.S. Patent Application Pub. No. 2015/0057959 A1 describes measuring the quadrature signal and subsequently subtracting the same using an appropriate coefficient from the main signal or in-phase signal.

SUMMARY

It is an object of the present invention to provide a method for processing signals from a gyroscope that is an alternative to the related art method. Example embodiments of the method according to the present invention may make possible the long-term stability and insensitivity to gyroscope drifts in a resource-conserving, space-saving and cost-effective manner.

The objective is achieved, for example:
in a second method step, by storing the quadrature signal in a memory unit of the device;
in a third method step, by the demodulator demodulating the modulated signal in such a way that an in-phase signal is generated during a second time interval;
in a fourth method step, by an output signal for describing a rotation of the gyroscope about a defined sensing axis being generated from the in-phase signal.

By storing the quadrature signal in a memory unit of the device, and thus holding it in readiness for a later use, the need is hereby advantageously eliminated for components of analog circuits, such as trimmable capacitive dividers, analog-digital converters and filters. A method is hereby provided that offers another possibility for reducing energy consumption and surface area, for example, on an ASIC of a micromechanical component that includes the gyroscope, which is particularly important for developing micromechanical components that include further generations of gyroscopes.

It is especially possible to reduce the components of analog circuits by an example method according to the present invention making possible a device having merely one sensing path for the defined sensing axis. In other words, the method according to the present invention makes it possible for the device to include merely one sensing path per defined axis. In this case, both the quadrature signal, as well as the in-phase signal are read out via the one sensing path by a time division, in particular by a division into the first time interval and the second time interval.

A method is hereby provided for processing signals from a gyroscope that is an alternative to the related art method, the long-term stability and insensitivity to gyroscope drifts being made possible in a resource-conserving, space-saving and cost-effective manner. In particular, the method according to the present invention makes it possible to counter such drifts of output signals from gyroscopes that occur in response to changes in quadrature signals. Changes in quadrature signals are often caused here by stresses due to manufacturing steps, soldering steps, temperatures or the effects of aging, particularly during the lifetime of a gyroscope.

In accordance with the present invention, the gyroscope is a MEMS-based gyroscope or a MEMS gyroscope.

Advantageous embodiments and refinements of the present invention may be derived from the description herein, reference being made to the figures.

Another preferred example embodiment of the present invention provides that,
in the fourth method step, a function is applied to the quadrature signal and to the in-phase signal in a processor unit of the device to generate the output signal. This advantageously makes it possible to provide an output signal for describing the rotation of the sensor element about the defined sensing axis as an essentially quadrature-corrected output signal without the need for feeding the quadrature signal back to the modulated signal and thus saving components from a possible feedback loop.

Another preferred example embodiment provides that,
in a fifth method step, another function is applied to a raw signal of the signals and on the quadrature signal in a sensor channel of the device to generate the modulated signal. This advantageously makes it possible to provide an output signal for describing the rotation of the sensor element about the defined sensing axis as an essentially quadrature-corrected output signal without having to perform other method steps in a processor unit of the device, respectively without having to provide further components.

Another object of the present invention is to provide a device for processing signals, the device being configured in such a way that a gyroscope of the device generates the signals, the demodulator of the device receiving a modulated signal of the signals;

in a first method step, the demodulator demodulating the modulated signal during a first time interval in such a way that a quadrature signal is generated; the device being configured in such a way that, in a second method step, the quadrature signal is stored in a memory unit of the device;

in a third method step, the demodulator demodulating the modulated signal during a second time interval in such a way that an in-phase signal is generated;

in a fourth method step, an output signal for describing a rotation of the gyroscope about a defined sensing axis being generated from the in-phase signal.

One preferred further embodiment provides that the device be configured in such a way that, in the fourth method step, a function is applied to the quadrature signal and to the in-phase signal in a processor unit of the device to generate the output signal.

One preferred further embodiment provides that the device be configured in such a way that, in a fifth method step, another function is applied to a raw signal of the signals and to the quadrature signal in a sensor channel of the device to generate the modulated signal.

The mentioned advantages of the method according to the present invention also apply analogously to the device according to the present invention.

DETAILED DESCRIPTION OF EXAMPLE EMBODIMENTS

Figure 1:
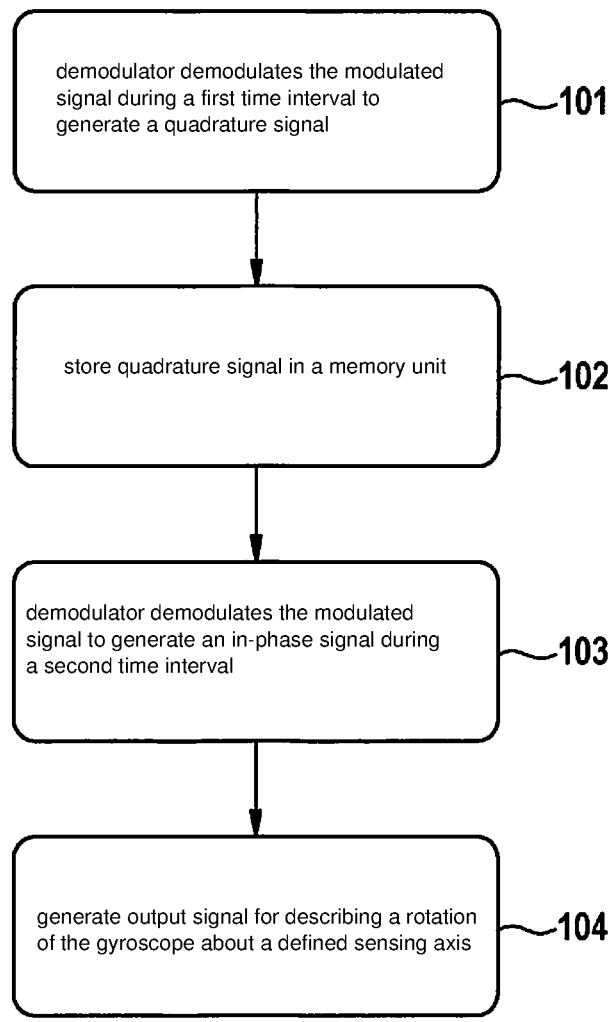
FIG. 1 is a schematic view of a method in accordance with an exemplary embodiment of the present invention.

In the various figures, the same parts are always denoted by the same reference numerals and, therefore, are also typically only named or mentioned once.

FIG. 1 is a schematic representation of a method in accordance with an exemplary embodiment of the present invention, the method being provided for processing signals, and the signals being generated by a gyroscope 1 of a device 200. Here, a demodulator of device 200 receives a modulated signal of the signals. The method encompasses a first method step 101, a second method step 102, a third method step 103, and a fourth method step 104. In first method step 101, demodulator 5 demodulates the modulated signal during a first time interval in such a way that a quadrature signal is generated. Moreover, in second method step 102, the quadrature signal is stored in a memory unit 7 of device 200. Moreover, in third method step 103, demodulator 5 demodulates the modulated signal in such a way that an in-phase signal is generated during a second time interval. Finally, in fourth method step 104, an output signal for describing a rotation of gyroscope 1 about a defined sensing axis is generated from the in-phase signal.

Figure 2:
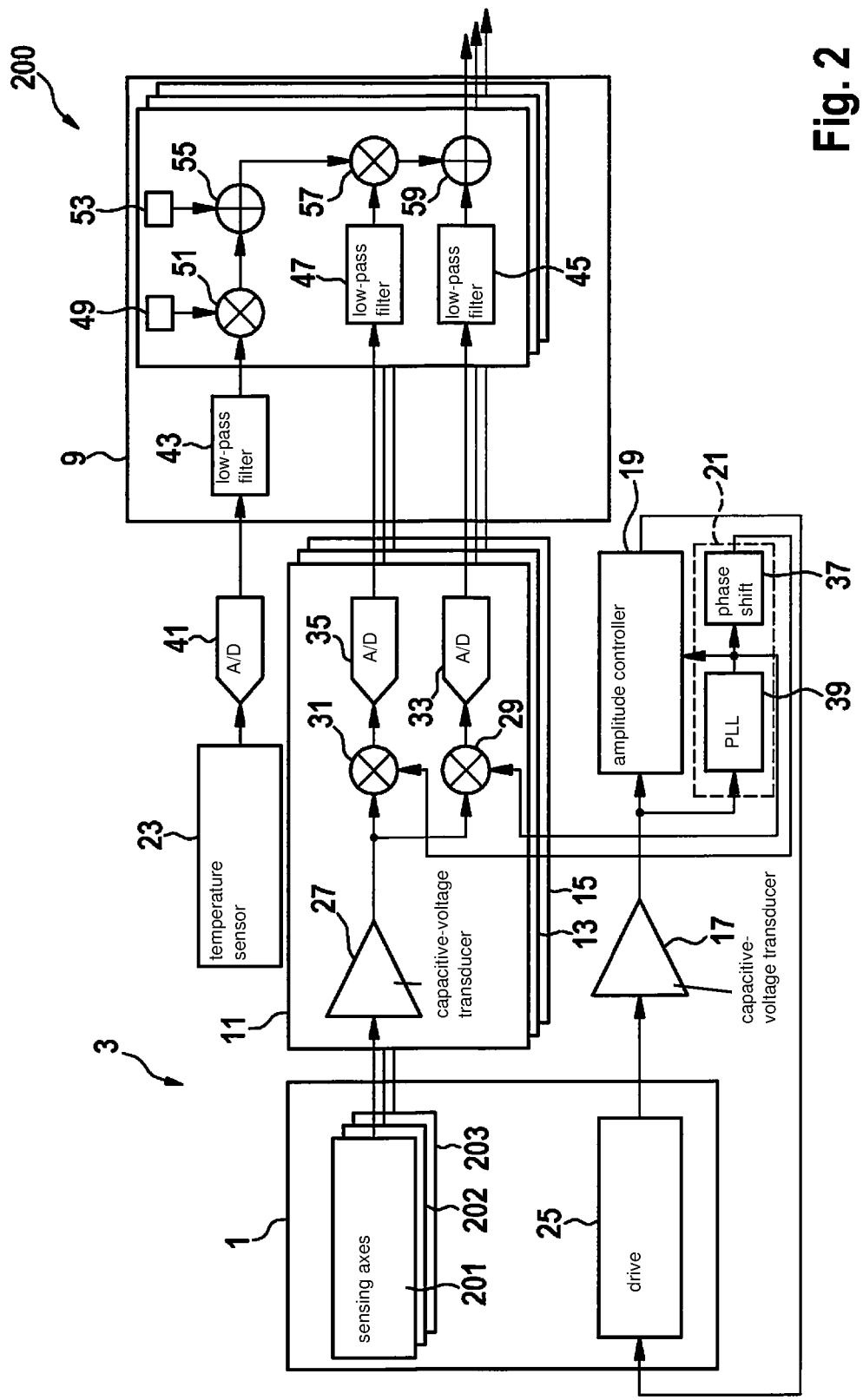
FIG. 2 is a schematic representation of a device from the related art.
Figure 3:
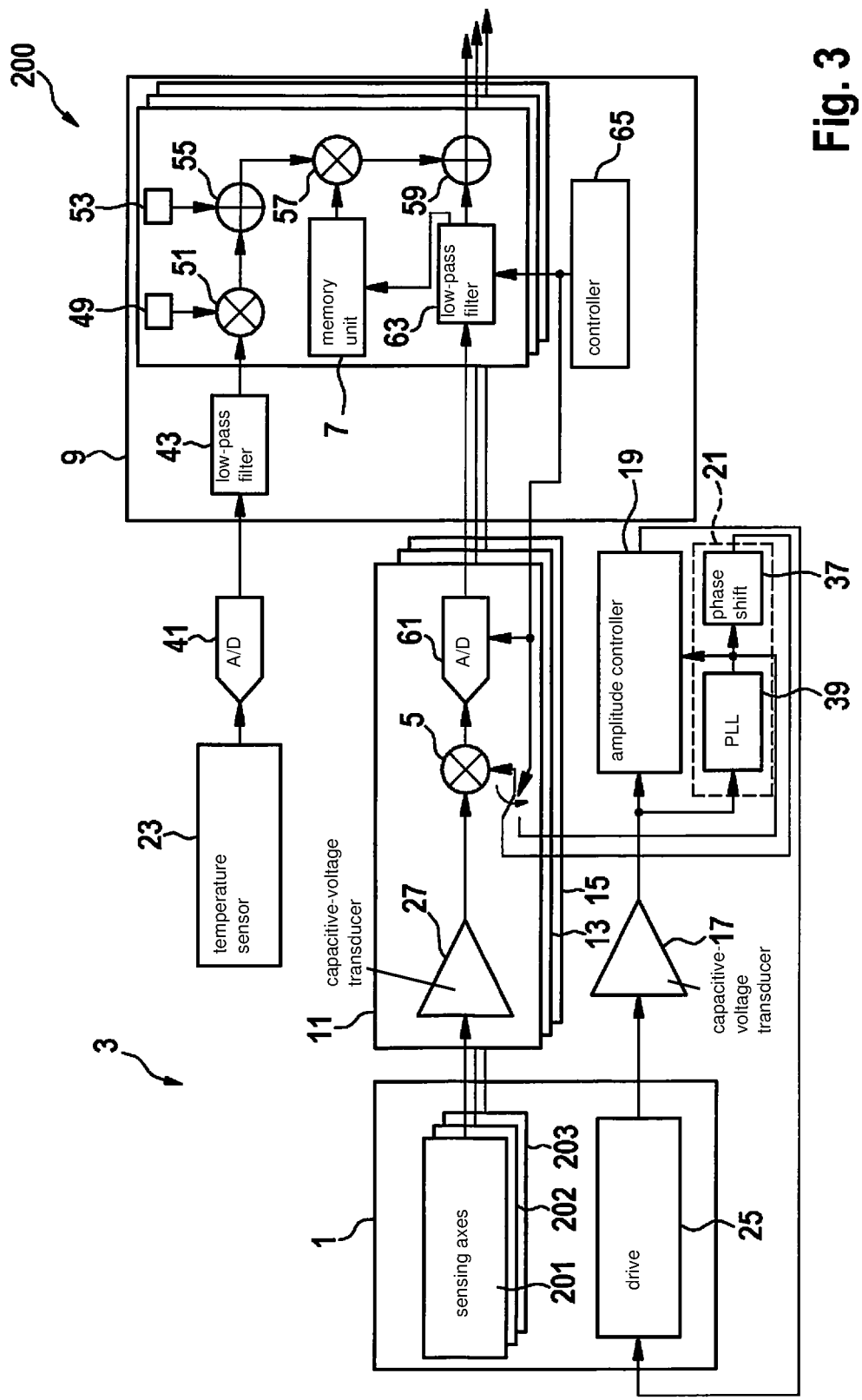
FIGS. 3 and 4 show, in schematic representations, devices in accordance with exemplary specific embodiments of the present invention.
Figure 4:
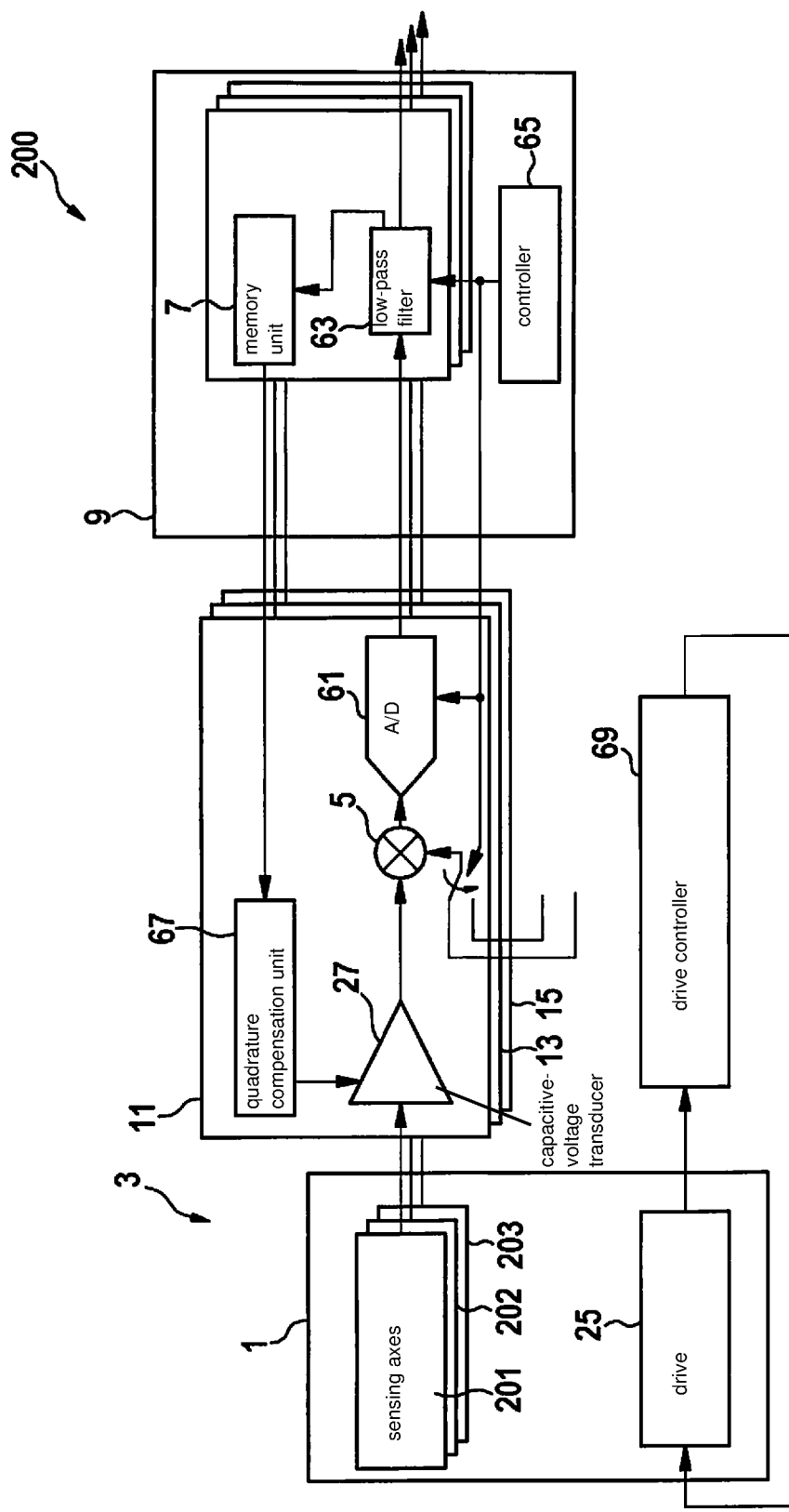

FIG. 2 shows a schematic representation of a device 200 from the related art. In schematic representations, FIGS. 3 and 4 show devices 200 in accordance with exemplary specific embodiments of the present invention.

Device 200 includes a gyroscope 1, a processor unit 9, and a sensor channel 11. Moreover, device 200 includes another sensor channel 13, a third sensor channel 15, a capacitance-voltage transducer 17, an amplitude controller 19, a phase-locked loop 21, and a temperature sensor 23.

In the case of device 200, gyroscope 1 is a vibration gyroscope, such as an MEMS gyroscope. Gyroscope 1 is configured in such a way that a rotation thereof about a defined sensing axis 201, about a defined further sensing axis 202, and about a defined third sensing axis 203 is detectable. In this case, sensing axis 201, further sensing axis 202, and third sensing axis 203 are essentially configured vertically relative to each other. Gyroscope 1 is also configured to generate signals, the signals including raw signals, preferably modulated raw signals. It is provided here that the signals include raw signals responsive to the movement of a vibrating test mass and responsive to a rotation of the gyroscope about sensing axis 201, further sensing axis 202, respectively third sensing axis 203.

Moreover, gyroscope 1 includes a drive 25. Drive 25 is configured in such a way that test masses assigned in each case to sensing axis 201, further sensing axis 202, and third sensing axis 203 are excited in response to a specified frequency in such a way that, in response to a rotation of the gyroscope about sensing axis 201, further sensing axis 202, respectively third sensing axis 203, forces acting on the test masses essentially orthogonally to the respective drive directions and sensing axes generate raw signals. For this purpose, drive 25 receives a drive signal in order to set the respective test masses into vibration in response to specified frequencies.

Sensor channel 11 is electrically connected to an output of sensing axis 201, so that a force acting on the vibrating test mass of sensing axis 201 induces a raw signal to be transmitted from the output of sensing axis 201 to sensor channel 11. Sensor channel 11 includes a further capacitance-voltage transducer 27; further capacitance-voltage transducer 27 being configured in such a way that the raw signal is converted from a modulated capacitance output signal of sensing axis 201 to a modulated voltage signal.

Moreover, sensor channel 11 includes an I/Q demodulator; the I/Q demodulator including an in-phase demodulator 29 and a quadrature phase demodulator 31. Here, in-phase demodulator 29 and quadrature phase demodulator 31 are electroconductively connected to an output of capacitance-voltage transducer 27, so that in-phase demodulator 29 and quadrature phase demodulator 31 receive the modulated voltage signal of sensing axis 201. Moreover, in-phase demodulator 29 and quadrature phase demodulator 31 are designed as inverters in such a way that the modulated voltage signal of sensing axis 201 is demodulated in response to in-phase tracking signals and quadrature-phase tracking signals transmitted by phase-locked loop 21 to in-phase demodulator 29 and quadrature-phase demodulator 31. Here, device 200 is designed in such a way that in-phase demodulator 29 is connected to an in-phase output of phase-locked loop 21, so that the in-phase tracking signal is transmitted by phase-locked loop 21 to in-phase demodulator 29, and quadrature-phase demodulator 31 is connected to a quadrature-phase output of phase-locked loop 21, so that phase-locked loop 21 transmits the quadrature phase tracking signal to quadrature-phase demodulator 31. Here, the in-phase tracking signal and the quadrature-phase tracking signal are 90° phase-shifted relative to each other. Moreover, it is provided that in-phase demodulator 29 demodulates the modulated voltage signal of sensing axis 201 in such a way that an in-phase component of the modulated voltage signal, respectively the in-phase signal is generated. Moreover, it is provided that quadrature phase demodulator 31 demodulates the modulated voltage signal of sensing axis 201 in such a way that a quadrature phase component of the modulated voltage signal, respectively the quadrature signal is generated.

Moreover, sensor channel 11 includes an analog-digital converter 33 and a further analog-digital converter 35. Here, analog-digital converter 33 generates a digital in-phase signal from analog in-phase signal. Moreover, further analog-digital converter 35 generates a digital quadrature signal from the analog quadrature signal.

Further sensor channel 13 and third sensor channel 15 are essentially formed, respectively configured relative to further sensing axis 202 and third sensing axis 203, essentially in the manner of sensor channel 11 relative to sensing axis 201.

Drive 25 of device 200 receives the drive signal from amplitude controller 19 of device 200. For the drive of drive 25, amplitude controller 19 controls or determines the amplitude of the drive signal here in order to set the respective test masses into vibration at specific amplitudes, respectively while maintaining specific amplitudes, in response to specified frequencies. In this case, amplitude controller 19 and phase-locked loop 21 control drive 25 in a closed control loop.

An output signal of drive 25 is transmitted here to capacitance-voltage transducer 17. Capacitance-voltage transducer 17 generates herefrom a voltage signal that corresponds to the oscillation along a drive axis of the drive. Capacitance-voltage transducer 17 transmits the voltage signal to phase-locked loop 21. From the voltage signal, phase-locked loop 21 generates a tracking signal for determining the frequency and phase of the drive signal. Phase-locked loop 21 generates the time-dependent tracking signal which describes the movement, respectively vibration of one or a plurality of test masses of gyroscope 1. This tracking signal essentially corresponds to an in-phase tracking signal, phase-locked loop 21 transmitting the in-phase tracking signal to amplitude controller 19. Phase-locked loop 21 hereby controls the amplitude controller in such a way that the amplitude, phase and frequency of the drive signal are tuned to the actual movement of the particular test masses. Moreover, phase-locked loop 21 transmits the in-phase tracking signal to in-phase demodulator 29 to control the same. Phase-locked loop 21 includes a phase shift circuit 37; phase shift circuit 37 shifting the phase of the in-phase tracking signal generated by a phase-locked loop unit 39 of phase-locked loop 21 by 90° and thus including a quadrature phase tracking signal for controlling quadrature phase demodulator 31.

Output signals of a phase-locked loop 21 control drive 25, in-phase demodulator 29, and quadrature phase demodulator 31. Temperature influences, for example, within gyroscope 1 cause phase shift errors in the modulated voltage signal and thus in the in-phase signal and in the quadrature signal.

Temperature sensor 23 generates an analog temperature signal that contains information about a temperature of gyroscope 1. Temperature sensor 23 transmits the analog temperature signal to a third analog-to-digital converter 41 which, in turn, converts the same into a digital temperature signal for a further processing in processor unit 9. Temperature sensor 23 and third analog-to-digital converter 41 supply temperature data; a factor to be applied to the quadrature signal being derived from the temperature data. It is assumed in this connection that the phase shift error, respectively the absolute value thereof depends on the temperature of the gyroscope.

Device 200 is configured in such a way that processor unit 9 receives digital in-phase signals from analog-to-digital converter 33, digital quadrature signals from further analog-to-digital converter 35, and digital temperature signals from third analog-to-digital converter 41.

Moreover, processor unit 9 is configured to receive digital in-phase signals and digital quadrature signals from further sensor channel 13 and from third sensor channel 15 in response to a rotation of gyroscope 1 about a defined further sensing axis 202 and a defined third sensing axis 203.

Processor unit 9 includes a low-pass filter 43, a further low-pass filter 45, and a third low-pass filter 47. Low-pass filter 43 is hereby applied to the digital temperature signal to produce a filtered digital temperature signal, further low-pass filter 45 to the digital in-phase signal to produce a filtered digital in-phase signal, and third low-pass filter 47 to the digital quadrature signal to generate a filtered digital quadrature signal. This advantageously makes it possible, in particular, for mixed products having double the frequency (in comparison to the carrier frequency) to be filtered out of the digital in-phase signal and the digital quadrature signal.

With the aid of a multiplier 51, processor unit 9 multiplies the filtered digital temperature signal by a constant 49, for example, constant $c_1$, and, with the aid of an adder circuit 55, subsequently adds the filtered digital temperature signal multiplied by first constant 49 to another constant 53, for example, constant $c_0$. Constant 49 and further constant 53 are stored here in a further memory unit assigned to processor unit 9.

Moreover, the processor unit includes a further multiplier 57; further multiplier 57 multiplying the output of adder circuit 55, respectively the factor by the output of third low-pass filter 47, respectively by the filtered digital quadrature signal to produce a scaled, filtered digital quadrature signal. It is provided here that multiplier 57 includes a multiplication by −1, so that multiplier 57 provides a negative, scaled, filtered digital quadrature signal.

Moreover, processor unit 9 includes a further adder circuit 59; with the aid of further adder circuit 59, the negative, scaled, filtered, digital quadrature signal and the filtered, digital in-phase signal being summed, and thus further adder circuit 59 generating, respectively providing an output signal for describing a rotation of gyroscope 1 about a defined sensing axis 201. Processor unit 9 hereby dynamically adapts the factor on the basis of the temperature measured by temperature sensor 23 and on the basis of calibration data of gyroscope 1 to counter variations in the phase shift error, respectively minimize the influence of phase shift errors on the output signal. In other words, a component of the quadrature signal in the filtered, digital in-phase signal caused by the phase-shift error is computationally eliminated from the in-phase signal, so that an output signal is provided for describing the rotation of sensor element 1 about defined sensing axis 201 as an essentially quadrature-corrected output signal.

Device 200 illustrated in FIGS. 3 and 4 is configured for processing signals in such a way that gyroscope 1 of device 200 generates the signals, and demodulator 5 of device 200 receives a modulated signal of the signals. Moreover, device 200 is configured in such a way that, during a first time interval, demodulator 5 demodulates the modulated signal in such a way that the quadrature signal is generated. In addition, device 200 is configured in such a way that the quadrature signal is stored in a memory unit 7 of device 200. Moreover, device 200 is configured in such a way that demodulator 5 demodulates the modulated signal during a second time interval in such a way that an in-phase signal is generated, and an output signal for describing a rotation of gyroscope 1 about a defined sensing axis 201 is generated from the in-phase signal.

Here, sensor channel 11 illustrated in FIGS. 3 and 4 exemplarily includes merely demodulator 5 and a third analog-to-digital converter 61. Moreover, processor unit illustrated in FIGS. 3 and 4 exemplarily includes a fourth low-pass filter 63 and a controller 65.

In contrast to device 200 illustrated in FIG. 2, device 200 illustrated exemplarily in FIGS. 3 and 4 merely includes a sensing path in each particular case for defined sensing axis 201, defined further sensing axis 202 and defined third sensing axis 203. In other words, the present invention eliminates the need in each sensing path for a demodulator, an analog-to-digital converter and a low pass filter, for example. In device 200 illustrated exemplarily in FIGS. 3 and 4, both the quadrature signal, as well as the in-phase signal are read out in a sensing path. This is made possible by device 200 being configured in such a way, for example, that demodulator 5 is adapted to be connectible to an in-phase output of phase-locked loop 21 and to a quadrature-phase output of phase-locked loop 21. Device 200 is configured in such a way, for example, that phase-locked loop 21 alternately transmits the quadrature-phase tracking signal to modulator 5, particularly during the first time interval, and the in-phase tracking signal to modulator 5, particularly during the second time interval. Device 200 is configured in such a way, for example, that controller 65 connects quadrature phase output and in-phase output, respectively phase-locked loop 21. This is shown exemplarily by an arrow in FIGS. 3 and 4.

For example, in the case of device 200 illustrated in FIGS. 3 and 4, it is provided that, each time the quadrature signal is generated in first method step 101, the quadrature signal is stored in memory unit 7, preferably in a digital memory unit 7, of device 200. For example, the stored quadrature signal is used in this case for compensating for the in-phase signal in such a way that an output signal for describing the rotation of sensor element 1 about defined sensing axis 201 is generally provided as a quadrature-corrected output signal.

For example, device 200 is configured in such a way that, in fourth method step 104, a function is applied to the quadrature signal and to the in-phase signal in processor unit 9 of device 200 to generate the output signal.

It is, moreover, provided in accordance with the present invention that—in a sixth method step, preferably controller 65 connects demodulator 5 to the quadrature phase output of phase-locked loop 21. It is also preferably provided that, in the sixth method step, analog circuits of device 200 are configured in such a way that quadrature signals, respectively quadrature components of the modulated signal are transmittable with the aid of the analog circuits. It is especially preferred that the sixth method step be carried out before first method step 101.

For example, after the sixth method step, a, preferably one single, quadrature measurement is carried out, respectively first method step 101 is carried out.

Moreover, for example, subsequently to first method step 101, the resulting value for each channel, respectively for sensor channel 11, for further sensor channel 13 and for third sensor channel 15 are stored in memory unit 7, preferably of a digital memory unit 7, respectively in the memory units associated with the particular sensor channels, respectively second method step 102 is carried out.

Moreover, it is preferably provided in accordance with the present invention that, preferably after second method step 102, — in a seventh method step, preferably controller 65 connects demodulator 5 to the in-phase output of phase-locked loop 21. It is also preferably provided that, in the seventh method step, analog circuits of device 200 are configured in such a way that in-phase signals, respectively in-phase components of the modulated signal are transmittable with the aid of the analog circuits. It is especially preferred that the seventh method step be carried out after second method step 102.

For example, after the seventh method step, an in-phase measurement, preferably a plurality of in-phase measurements are performed; respectively third method step 103 is carried out.

Moreover, it is also provided, for example, that, subsequently to the third method step, a result of the in-phase measurement, respectively results of each of the plurality of in-phase measurements, and the stored, resulting value of the quadrature measurement, a stored resulting value of the quadrature measurement, preferably modified by a constant, especially by a first constant 49, and a further constant 53, are summed, and thus the output signal is generated, respectively fourth method step 104 is carried out. It is provided here, for example, that the constant and/or first constant 49 and/or further constant 53 be determinable by measurements, simulations and/or calculations. It is preferably provided that the constant and/or first constant 49 and/or further constant 53 are/is determinable by measurements, simulations and/or calculations in each case as a function of a temperature, preferably as a function of a temperature measured by the temperature sensor.

It is also provided that, subsequently to the fourth method step, in an eighth method step, the output signal is stored in a third memory unit of device 200, respectively in a third memory unit associated with device 200. Third memory unit is preferably an output register.

Moreover, it is provided, for example, that the quadrature measurement, respectively first method step 101 is merely implemented during a start phase of gyroscope 1. However, it is also alternatively or additionally provided, for example, that the quadrature measurement, respectively first method step 101 is carried out at different, preferably at regular successive instants during the operation of gyroscope 1. However, it is also alternatively or additionally provided, for example, that the quadrature measurement, respectively first method step 101 is triggered by an external influence, preferably by a temperature change. Finally, it is also alternatively or additionally provided, however, for the quadrature measurement or first method step 101 to be performed as a function of user input or, for example, when deemed appropriate by a user, during a reset of device 200 or of gyroscope 1, for example.

It is preferably provided that device 100 include a micromechanical component 3, micromechanical component 3 including gyroscope 1 and an ASIC. It is especially preferred that ASIC include sensor channel 11, further sensor channel 13, third sensor channel 15, capacitance-voltage transducer 17, amplitude controller 19, phase-locked loop 21, processor unit 9, temperature sensor 23 and third analog-to-digital converter 41. However, it is also alternatively provided that the ASIC merely include a portion of sensor channel 11, further sensor channel 13, third sensor channel 15, capacitance-voltage transducer 17, amplitude controller 19, phase-locked loop 21, processor unit 9, temperature sensor 23 and third analog-to-digital converter 41. In other words, it is provided that the inventive method is entirely carried out in micromechanical component 3 that includes gyroscope 1, respectively in the ASIC of micromechanical component 3 or at least partially in an external unit assigned to micromechanical component 3 respectively to the ASIC of micromechanical component 3, preferably an external controller, especially an external microcontroller.

For example, it is also provided that device 200 is configured in such a way that the quadrature, respectively quadrature signals, respectively quadrature components of the modulated signal are suppressed with the aid of force signals in the gyroscope, respectively removed from the modulated signal. For example, it is also provided, however, that device 200 is configured in such a way that the quadrature, respectively quadrature signals, respectively quadrature components of the modulated signal are compensated by the modulated signal with the aid of electrical compensations in the front end of the device.

For this, device 200 that is exemplarily illustrated in FIG. 4 is configured in such a way that, in a fifth method step, another function is applied to a raw signal of the signals and to the quadrature signal in a sensor channel 11 of device 200 to generate the modulated signal. In other words, device 200 is configured in such a way that, in the fifth method step, memory unit 7 transmits the stored quadrature signal to a quadrature compensation unit 67, preferably to a circuit for quadrature compensation, and quadrature compensation unit 67 transmits the same via further capacitance-voltage transducer 27, and to the raw signal in the manner of a closed control circuit.

It is preferably provided in accordance with the present invention that, subsequently to the fifth method step, device 200 illustrated in FIG. 4 be configured in such a way that an in-phase measurement, preferably a plurality of in-phase measurements are performed, respectively that third method step 103 is carried out. Finally, FIG. 4 shows that device 200 includes a drive controller 69 for controlling and driving drive 25.

What is claimed is:

1. A method for processing signals, the method comprising:

generating signals by a gyroscope of a device;
receiving, by a demodulator of the device, a modulated signal of the signals;
in a first method step, demodulating, by the demodulator, the modulated signal during a first time interval in such a way that a quadrature signal is generated;
in a second method step, storing the quadrature signal in a memory unit of the device;
in a third method step, the demodulator demodulating the modulated signal in such a way that an in-phase signal is generated during a second time interval; and
in a fourth method step, generating an output signal for describing a rotation of the gyroscope about a defined sensing axis from the in-phase signal,
wherein the stored quadrature signal is used for compensating for the in-phase signal such that the output signal is provided as a quadrature-corrected output signal,
wherein the demodulator is adapted to be connectible to an in-phase output and a quadrature-phase output of a phase-locked loop, wherein the phase-locked loop alternately transmits a quadrature-phase tracking signal to the modulator during a first time interval and the in-phase tracking signal to the modulator during a second time interval.

2. The method as recited in claim 1, wherein in the fourth method step, a function is applied to the quadrature signal and to the in-phase signal in a processor unit of the device to generate the output signal.

3. The method as recited in claim 1, further comprising:
in a fifth method step, the memory unit transmits the stored quadrature signal to a quadrature compensation unit which transmits the stored quadrature signal via a further capacitance-voltage transducer.

4. A device for processing signals, the device being configured to:
generate the signals by a gyroscope of the device;
receive a modulated signal of the signals by a demodulator of the device;
demodulate the modulated signal by the demodulator during a first time interval in such a way that a quadrature signal is generated;
store the quadrature signal in a memory unit of the device;
demodulate the modulated signal, by the demodulator, in such a way that an in-phase signal is generated during a second time interval; and
generate an output signal for describing a rotation of the gyroscope about a defined sensing axis from the in-phase signal,
wherein the stored quadrature signal is used for compensating for the in-phase signal such that the output signal is provided as a quadrature-corrected output signal,
wherein the demodulator is adapted to be connectible to an in-phase output and a quadrature-phase output of a phase-locked loop, wherein the phase-locked loop alternately transmits a quadrature-phase tracking signal to the modulator during the first time interval and the in-phase tracking signal to the modulator during the second time interval.

5. The device as recited in claim 4, wherein the device is configured to generate the output signal by applying a function to the quadrature signal and to the in-phase signal in a processor unit of the device.

6. The device as recited in claim 4, wherein the device is further configured to:
transmit the stored quadrature signal to a quadrature compensation unit which transmits the stored quadrature signal via a further capacitance-voltage transducer.

* * * * *